United States Patent Office 3,287,284
Patented Nov. 22, 1966

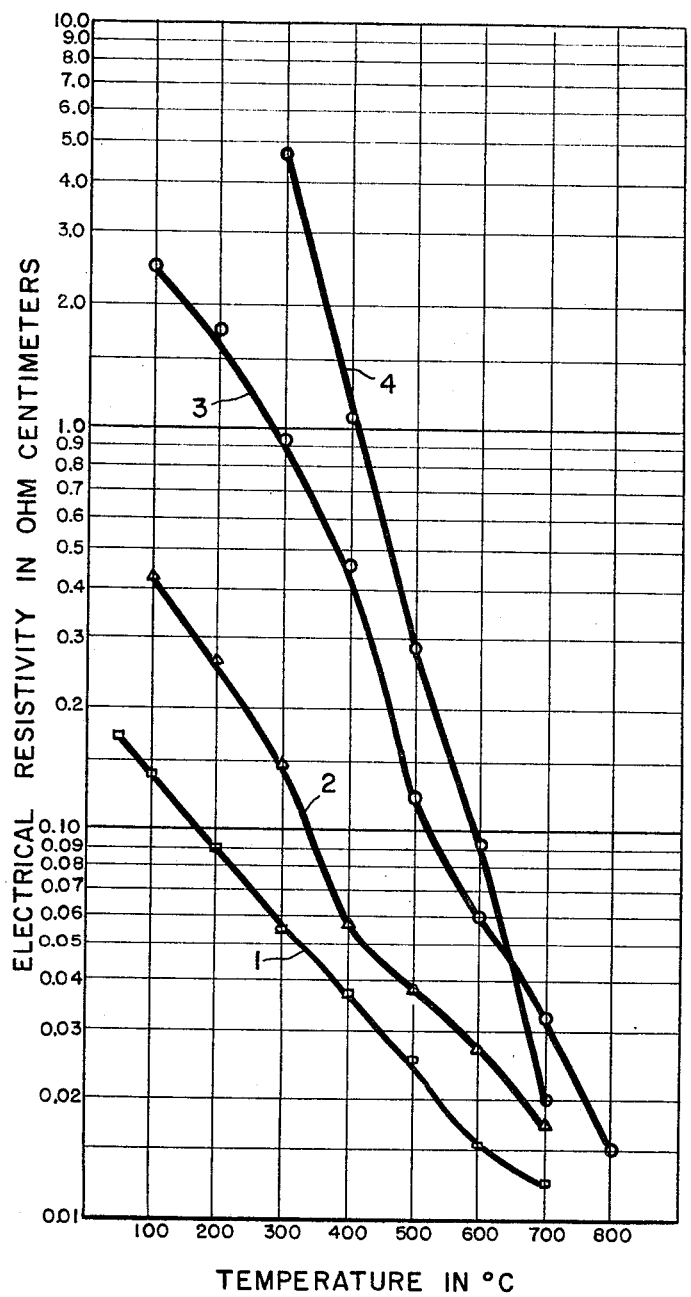

3,287,284
CERAMIC REFRACTORY BODIES
Emmerson K. Norman, Horseheads, N.Y., assignor to Corhart Refractories Company, Louisville, Ky., a corporation of Delaware
Filed May 18, 1964, Ser. No. 368,009
4 Claims. (Cl. 252—518)

This invention relates to improvements in electrically conducting, sintered or bonded, tin oxide base refractory bodies, which are commonly used as electrodes in the electrical melting of glass.

Heretofore it has been known to add 0.5–2% by weight of a single oxide modifier to tin oxide to accelerate the firing shrinkage and to maximize the total shrinkage as best possible without requiring excessive firing time. Such a modifier is known as a shrinking agent and is an oxide of either cobalt, copper, gold, iron, manganese, nickel, silver, vanadium or zinc. Substantial shrinkage is important because resistance to molten glass corrosion increases as the density increases (or the porosity decreases).

It is also known to add 0.5–5% by weight of an oxide modifier to tin oxide to lower the electrical resistivity of sintered bodies made therefrom and thereby improve the electrical conductivity, which is very beneficial in electrodes for melting of glass. Such a modifier is known as a resistivity modifier and is an oxide of either antimony, arsenic, bismuth, tantalum or uranium. Vanadium oxide is reported to perform a dual role and also function as a resistivity modifier, particularly when combined with antimony oxide.

Ideally in the earlier technology, a single shrinkage modifier was combined with one or two resistivity modifiers in the production of electrodes or other relatively dense, conductive tin oxide bodies. While it has been occasionally possible to obtain bodies with a resistivity as low as about 2 ohm centimeters at room temperature, provided very special care was taken in the manufacture thereof, the history of commercial production electrodes has shown a wide range in the variability of the electrical resistivity between individual electrodes, usually in the range of 2000 to 10,000 ohm centimeters at room temperature. This has made it a necessary practice to match electrodes with electrical characteristics as nearly similar as possible prior to installation in any particular glass melting tank or furnace.

I have now discovered that it is possible to consistently provide sintered tin oxide base refractory bodies with very low resistivity of less than 1 ohm centimeter at room temperature. This is accomplished by including a very small amount of 0.1 to 0.5% by weight copper oxide together with 0.5 to 1.0% by weight zinc oxide and 0.7 to 1.2% by weight antimony oxide in a tin oxide base sintered refractory body. The contents of zinc oxide and antimony oxide respectively contribute, as in the prior art, to shrinkage and densification on the one hand, and to lowering of the electrical resistivity on the other hand. However, the very low resistivity possible with this invention is surprisingly attained only by the additional presence of the very small amount of copper oxide noted above in combination with the specified zinc oxide and antimony oxide.

A further surprising additional benefit gained by the novel composition of this invention, as described above, is that bodies with much greater densities than heretofore obtainable can now be produced. The theoretical density of tin oxide is 7 grams per cubic centimeter. Prior commercially produced bodies generally had densities significantly less than 6 grams per cubic centimeter (e.g. 5.75–5.85 gm./cm.$^3$). Bodies of the present invention possess densities in excess of 6 grams per cubic centimeter and commonly within the range of 6.3 to 6.7 grams per cubic centimeter. This materially improved density contributes to improved resistance to molten glass corrosion.

A still further aspect of this invention is that I have found that resistance to spalling of the electrodes, or of other bodies made of my novel refractory subjected to thermal stress conditions in service, can be materially improved by providing 15 to 25% (preferably 20%) by weight of the tin oxide in the form of fine grog in the molded and sintered refractory body. As is well known in the ceramic art, grog is a form of the material produced by sintering comminuted raw material and then crushing the sintered mass into prefired particles or granules of desired size. In the usual production of our tin oxide base bodies, the comminuted raw material is usually finer than 325 mesh (Tyler). The size of the grog particles used in this invention are generally —200+325 mesh (Tyler) or even —325 mesh (Tyler). However, it will be appreciated that some variation can be made in these mesh sizes without departing from my invention.

The new tin oxide base bodies, like those of the known prior art, may be molded in known manner either by ramming or pressing a plastic batch in a mold or by forming a slip batch and casting it in the usual manner, e.g. in a plaster of Paris mold. It is preferred to use the oxides themselves as sources of the oxide constituents in the batch, particularly ZnO. The reason for this is that I have found the use of some soluble salts, such as $ZnCl_2$ or $ZnF_2$ (which convert to ZnO during firing), cause the development of a thin film of vitreous material or glassy phase to form between and along the boundaries between adjacent crystals thereby weakening the bonding between the crystals.

By way of illustrating the invention, a series of six 1000 gram batches were slip cast with —325 mesh material as follows: 1% by weight antimony oxide, 98% by weight tin oxide and a 1% by weight total of a combination of cupric oxide and zinc oxide. The CuO was varied from 0.05 to 0.3% by weight in increments of 0.05% for each succeeding sample while ZnO was correspondingly decreased by an equal amount. These slip cast bodies were then fired at 1450–1460° C. for 18–24 hours. The samples having CuO contents of 0.1 to 0.3% exhibited good crystal growth and excellent intercrystalline bonding. Porosity for these latter samples was materially lower such that the densities were found to range from 6.3 to 6.7 grams per cubic centimeter. The latter high density value was exhibited in the sample consisting essentially of 98% by weight $SnO_2$, 1% by weight $Sb_2O_3$, 0.8% ZnO and 0.2% CuO. For the 0.1 to 0.3% CuO series of examples, the electrical resistivity was consistently below one ohm-centimeter at room temperature, viz. ranging from 0.6 to less than 0.2 ohm centimeter at approximately 23° C. The resistivity for the high density sample noted above was below 0.2 ohm centimeter at room temperature. Resistivity values at elevated temperatures for the samples of this invention containing 0.1 and 0.2% by weight CuO are shown in the drawing (curves 2 and 1, respectively).

The sample with only 0.05% by weight CuO and 0.95% by weight ZnO from the foregoing series exhibited reasonably good crystal growth and bonding. However, shrinkage was poor as evidenced by substantial porosity and density less than 6 gm./cc. Also, the electrical resistivity of this sample was found to be 50 ohm centimeters at room temperature.

The novel results of this invention will be further appreciated in considering the contrast with a tin oxide base body without the very small copper oxide addition. A sample was made of —325 mesh material as follows:

98.2% by weight tin oxide, 1% by weight antimony oxide and 0.8% by weight zinc oxide. This sample was slip cast and the body fired at 1500° C. for 17 hours. Crystal structure was uniform with tight bonding between crystals. However, substantial pore spaces were left as a result of poorer shrinkage thereby yielding a density of only 5.92 gm./cc. Electrical resistivity was found to be 7.5 ohm centimeters at room temperature. The electrical resistivities at elevated temperatures for a body of the same composition but made with 20% by weight —200 mesh grog is shown in the drawing (curve 3).

Further evidence of the materially improved results of the present invention is provided by contrast to recent commercial production electrode bodies made of a composition consisting of 98.8% by weight tin oxide, 0.8% by weight antimony oxide and 0.4% by weight cupric oxide. The batch was composed of 80% by weight —325 mesh raw unfired material and 20% by weight —200 mesh grog. The bodies were slip cast and fired at approximately 1450° C. for about 18 hours or more. The densities ranged downward from 6.0 to 5.8 gm./cc. Electrical resistivities at room temperature ranged upward from 300 ohm centimeters. The resistivities at elevated temperatures are shown in the drawing (curve 4).

Bodies made according to this invention, but without an appropriate grog content (i.e. 15–25% by weight) were found to be subject to rather limited resistance to thermal shock of the same character as possessed by the commercial production electrodes (that included 20% grog) mentioned in the paragraph immediately above. Sample bars one inch square and three inches long of these two different kinds of bodies were subjected to a routine severe thermal shock test consisting of heating the bars to 1400° C. by placing them in a furnace previously heated to 1400° C. and holding them there for 10 minutes. Then the bars are brought out into the air and the small cross sectioned bars are allowed to cool in the air, which is relatively rapidly. This sequence is repeated until a loose fracture or spall occurs. The prior production composition bars and the bars of this invention without the appropriate grog content shattered into many small pieces during the first heating-cooling sequence. Bars of a composition according to this invention and containing 20% by weight grog, when subjected to the same thermal shock test, exhibited during the first sequence only two apparently complete fractures dividing the bar into approximately three equal size segments, but these segments did not separate loose from each other. Also several minute cracks were observed in each segment. Hence, the specified grog content in bodies of my invention produces a materially improved character of thermal shock resistance. However, the grogged bodies suffer slightly higher electrical resistivities, especially if the particle size of the grog is larger than 325 mesh (Tyler); therefore, when thermal shock is not deemed as important as low resistivity, it will be more desirable to omit the grog content.

I claim:

1. A sintered ceramic body consisting essentially of tin oxide and, based on the total body composition, 0.1% to 0.5% by weight of copper oxide, 0.5% to 1.0% by weight of zinc oxide and 0.7% to 1.2% by weight of antimony oxide.

2. A sintered ceramic body of claim 1 wherein 15% to 25% by weight of said tin oxide oxide is in the form of grog.

3. A sintered ceramic body consisting essentially of 98% by weight of tin oxide, 0.2% by weight of copper oxide, 0.8% by weight of zinc oxide and 1% by weight of antimony oxide.

4. A sintered ceramic body of claim 3 wherein 20% by weight of said tin oxide is in the form of grog.

References Cited by the Examiner

UNITED STATES PATENTS

| | | | |
|---|---|---|---|
| 2,244,777 | 6/1941 | Hood | 106—55 X |
| 2,467,144 | 3/1949 | Mochel | 252—517 |
| 2,490,825 | 12/1949 | Mochel | 254—518 |
| 2,490,826 | 12/1949 | Mochel | 252—517 |

FOREIGN PATENTS

| | | |
|---|---|---|
| 507,155 | 11/1954 | Canada. |
| 919,373 | 2/1963 | Great Britain. |

LEON D. ROSDOL, *Primary Examiner.*

JULIUS GREENWALD, ALBERT T. MEYERS,
*Examiners.*

J. D. WELSH, *Assistant Examiner.*